United States Patent
Kuwahara et al.

(10) Patent No.: US 10,654,092 B2
(45) Date of Patent: May 19, 2020

(54) METHOD AND APPARATUS FOR MANUFACTURING STEPPED MEMBER

(71) Applicant: NETUREN CO., LTD., Tokyo (JP)

(72) Inventors: Yoshitaka Kuwahara, Tokyo (JP); Kazuki Mori, Tokyo (JP); Takashi Ikeda, Tokyo (JP); Fumiaki Ikuta, Tokyo (JP)

(73) Assignee: NETUREN CO., LTD., Tokyo (JP)

(*) Notice: Subject to any disclaimer, the term of this patent is extended or adjusted under 35 U.S.C. 154(b) by 34 days.

(21) Appl. No.: 15/563,029

(22) PCT Filed: May 13, 2016

(86) PCT No.: PCT/JP2016/002353
§ 371 (c)(1),
(2) Date: Sep. 29, 2017

(87) PCT Pub. No.: WO2016/181660
PCT Pub. Date: Nov. 17, 2016

(65) Prior Publication Data
US 2018/0056371 A1 Mar. 1, 2018

(30) Foreign Application Priority Data

| May 14, 2015 | (JP) | 2015-098898 |
| Sep. 24, 2015 | (JP) | 2015-187128 |
| Oct. 9, 2015 | (JP) | 2015-200972 |

(51) Int. Cl.
*B21J 5/08* (2006.01)
*B21K 23/04* (2006.01)
(Continued)

(52) U.S. Cl.
CPC ............... *B21J 5/08* (2013.01); *B21K 1/24* (2013.01); *B21K 1/46* (2013.01); *B21K 23/04* (2013.01); *B23D 55/04* (2013.01)

(58) Field of Classification Search
CPC ........ B21J 5/08; B21J 9/06; B21K 1/46; B21K 23/04; B21K 1/24; B23D 55/04
See application file for complete search history.

(56) References Cited

U.S. PATENT DOCUMENTS

| 1,530,686 A | * | 3/1925 | Muller | .......................... | B23G 1/22 |
| | | | | | 408/28 |
| 3,466,917 A | * | 9/1969 | Eakin | ........................ | B21K 27/04 |
| | | | | | 72/359 |

(Continued)

FOREIGN PATENT DOCUMENTS

| DE | 102014212732 A1 * | 1/2016 | ................ B21J 5/08 |
| FR | 2 651 452 | 3/1991 | |

(Continued)

OTHER PUBLICATIONS

Machine Translation of JP3674399B2 (Year: 2005).*

(Continued)

Primary Examiner — Jacob J Cigna
Assistant Examiner — Michael W Hotchkiss
(74) Attorney, Agent, or Firm — Wenderoth, Lind & Ponack, L.L.P.

(57) ABSTRACT

A method and an apparatus for manufacturing a stepped member are provided. An intermediate portion of a shaft workpiece is radially enlarged while being compressed in an axial direction by applying alternating load to the intermediate portion in a direction intersecting the axial direction in a state in which pressure that compresses the shaft workpiece in the axial direction is applied to both ends of the shaft workpiece. The enlarged intermediate portion of the shaft workpiece is cat in a direction perpendicular to the axial direction so that the shaft workpiece is divided into two stepped members. Each of the stepped members has a shaft portion and a head portion provided at an axial end of the (Continued)

shaft portion, and the head portion has a larger diameter than the shaft portion.

2 Claims, 8 Drawing Sheets

(51) Int. Cl.
*B21K 1/46* (2006.01)
*B21K 1/24* (2006.01)
*B23D 55/04* (2006.01)

(56) References Cited

U.S. PATENT DOCUMENTS

| | | | | | |
|---|---|---|---|---|---|
| 3,867,832 | A | * | 2/1975 | Rut | B21J 5/08 72/399 |
| 4,272,979 | A | * | 6/1981 | Rut | B21K 1/08 29/6.01 |
| 4,805,500 | A | * | 2/1989 | Saito | B23D 53/045 83/168 |
| 5,054,195 | A | * | 10/1991 | Keck | B21K 1/22 29/888.451 |
| 6,568,233 | B2 | * | 5/2003 | Iura | B21D 17/025 72/101 |
| 8,522,594 | B2 | * | 9/2013 | Okabe | B21J 5/08 72/377 |
| 10,399,140 | B2 | * | 9/2019 | Zhou | B21H 3/04 |
| 2012/0070247 | A1 | * | 3/2012 | Tashima | B21K 1/463 411/378 |

FOREIGN PATENT DOCUMENTS

| | | | | | |
|---|---|---|---|---|---|
| JP | 10-323735 | | 12/1998 | | |
| JP | 2003-334633 | | 11/2003 | | |
| JP | 2003311368 | A | * 11/2003 | ............... | B21J 5/06 |
| JP | 2003334633 | A | * 11/2003 | ............... | B21J 5/08 |
| JP | 3674399 | B2 | * 7/2005 | ............ | B21K 23/04 |
| JP | 2007-260730 | | 10/2007 | | |
| JP | 2008121806 | A | * 5/2008 | ............... | F16K 1/00 |
| JP | 2012-229714 | | 11/2012 | | |
| JP | 2012229714 | A | * 11/2012 | .......... | F16D 3/2055 |
| JP | 2013-99771 | | 5/2013 | | |

OTHER PUBLICATIONS

Machine Translation of DE102014212732A1 (Year: 2014).*
Machine Translation of JP2008121806A (Year: 2008).*
Machine Translation of JP2003311368A (Year: 2003).*
Machine Translation of JP2003334633A (Year: 2003).*
Machine Translation of JP2012229714A (Year: 2012).*
International Search Report and Written Opinion of the International Searching Authority, dated Aug. 22, 2016 in International Application No. PCT/JP2016/002353.
Notice of Reasons for Refusal dated Feb. 18, 2020 in corresponding Japanese Patent Application No. 2015-200972, with English Translation.
Y. Kuwahara et at, "A Processing Method for Partially Enlarging Diameter of a Hollow Shaft by Combination of Cyclic Torsional Load with Axial Compressive Load", Journal of the JSTP, 2010, vol. 51, No. 591, pp. 331-335 (English Abstract).

* cited by examiner

METHOD AND APPARATUS FOR MANUFACTURING STEPPED MEMBER

TECHNICAL FIELD

The present invention relates to a method and an apparatus for manufacturing a stepped member having a shaft portion and a head portion provided at one end of the shaft portion, the head portion having a larger diameter than the shaft portion.

BACKGROUND ART

According to a first related art method, a shaft-shaped product is manufactured. Specifically, an engine valve is manufactured by hot forging. In this manufacturing method, an end portion of a blank obtained by cutting an elongated material is forged multiple times using a transfer press, whereby the end portion of the blank is enlarged step by step so as to be formed into a head portion having a relatively large diameter (see, e.g., JPH10-323735A).

According to a second related art method, a composite member is manufactured. Specifically, a stepped member is manufactured by joining a first member forming a head portion and a second member forming a shaft portion to each other. In this manufacturing method, an end portion of the second member is inserted into a bottomed hole provided in the first member, and shearing stress is provided repeatedly while providing compression stress in the second member in the axial direction, whereby the second member is enlarged inside the bottomed hole of the first member and the first member serving as the head portion is pressure welded to the end portion of the second member serving as the shaft portion (see, e.g., JP2013-99771A).

According to a third related art method, a shaft member of an outer joint for a constant speed universal joint is manufactured. Specifically, the shaft member to be welded to the bottom wall of a cup-shaped mouth portion is manufactured. In this manufacturing method, a bar workpiece is subjected to a shaft-diameter enlarging process to enlarge the intermediate portion of the bar workpiece, and the enlarged portion is cut and divided into two shaft members, whereby the divided enlarged portion remaining in each shaft member serves as a head portion having a relatively large diameter (see, e.g., JP2012-229714A).

The first related art method has excellent productivity because the head portion is provided by the forging process which is excellent in processing speed. However, since a metal mold is required for the forging process and the expense for the metal mold is high, cost is high in a case of a relatively small lot production.

The second related art method does not require a metal mold because the head portion is provided by the shaft-diameter enlarging process. However, the processing speed of the shaft-diameter enlarging process is generally slower than a forging process, so that there is a concern of low productivity.

The third related art method also does not require a metal mold because the head portion is formed by the shaft-diameter enlarging process and the cutting process. Further, in this method, since two shaft members are manufactured from a single bar workpiece, the disadvantage in processing speed due to the shaft-diameter enlarging process can be overcome.

However, in the third related art method, the bar workpiece is a solid workpiece. In this case, the enlarged portion that is enlarged by the shaft-diameter enlarging process and then cut by the cutting process is also solid, so the cutting process requires a long time, and there is a concern of low productivity due to the cutting process.

SUMMARY

Illustrative aspects of the present invention provide a method and an apparatus for manufacturing a stepped member with improved productivity and low cost.

According to an illustrative aspect of the present invention, a method for manufacturing a stepped member is provided. The stepped member has a shaft portion and a head portion provided at an axial end of the shaft portion, the head portion having a larger diameter than the shaft portion. The method includes radially enlarging an intermediate portion of a shaft workpiece while compressing the shaft workpiece in an axial direction of the shaft workpiece, and dividing the shaft workpiece into two stepped members. The radially enlarging includes applying alternating load to the intermediate portion of the shaft workpiece in a direction intersecting the axial direction in a state in which pressure that compresses the shaft workpiece in the axial direction is applied to both ends of the shaft workpiece. The dividing includes cutting the enlarged intermediate portion of the shaft workpiece in a direction perpendicular to the axial direction.

According to another illustrative aspect of the present invention, an apparatus for manufacturing a stepped member is provided. The stepped member has a shaft portion and a head portion provided at an axial end of the shaft portion, the head portion having a larger diameter than the shaft portion. The apparatus includes a shaft-diameter enlarging machine configured to apply alternating load to an intermediate portion of a shaft workpiece in a direction intersecting an axial direction of the shaft workpiece in a state in which pressure that compresses the shaft workpiece in the axial direction is applied to both ends of the shaft workpiece so as to radially enlarge the intermediate portion of the shaft workpiece while compressing the shaft workpiece in the axial direction, and a cutting machine configured to cut the enlarged intermediate portion of the shaft workpiece in a direction perpendicular to the axial direction so as to divide the shaft workpiece into two stepped members.

Other aspects and advantages of the invention will be apparent from the following description, the drawings and the claims.

DESCRIPTION OF EMBODIMENTS

Hereinafter, embodiments of the present invention will be described in detail with reference to the drawings.

Figure 1:
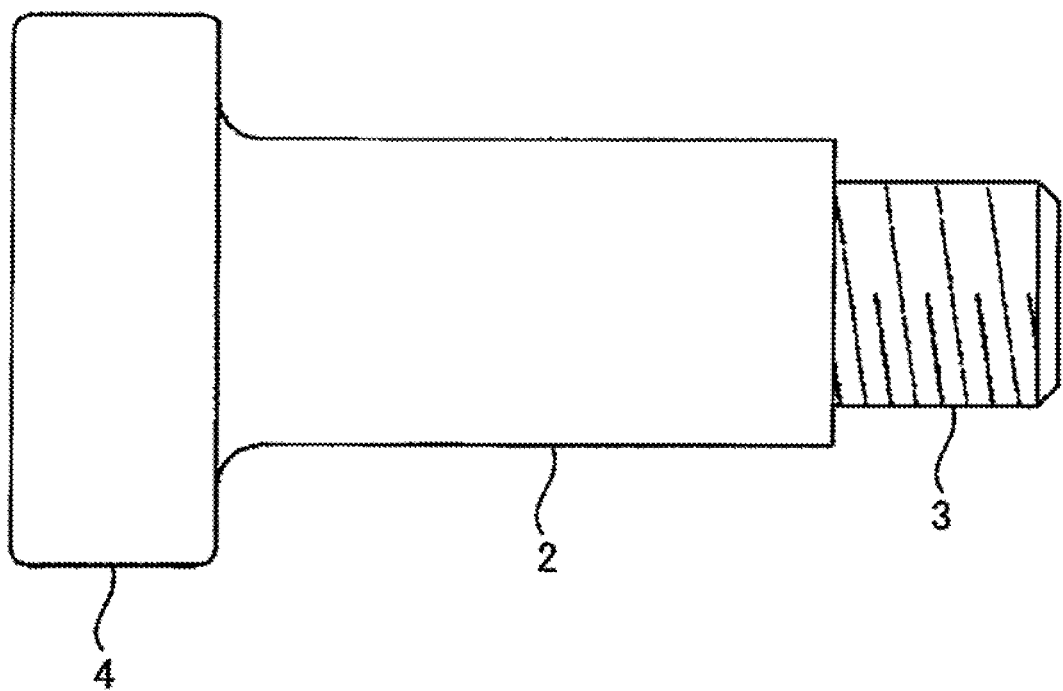
FIG. 1 is a plan view of an example of a stepped member to be manufactured by a method and an apparatus according to an embodiment of the present invention.
Figure 2:
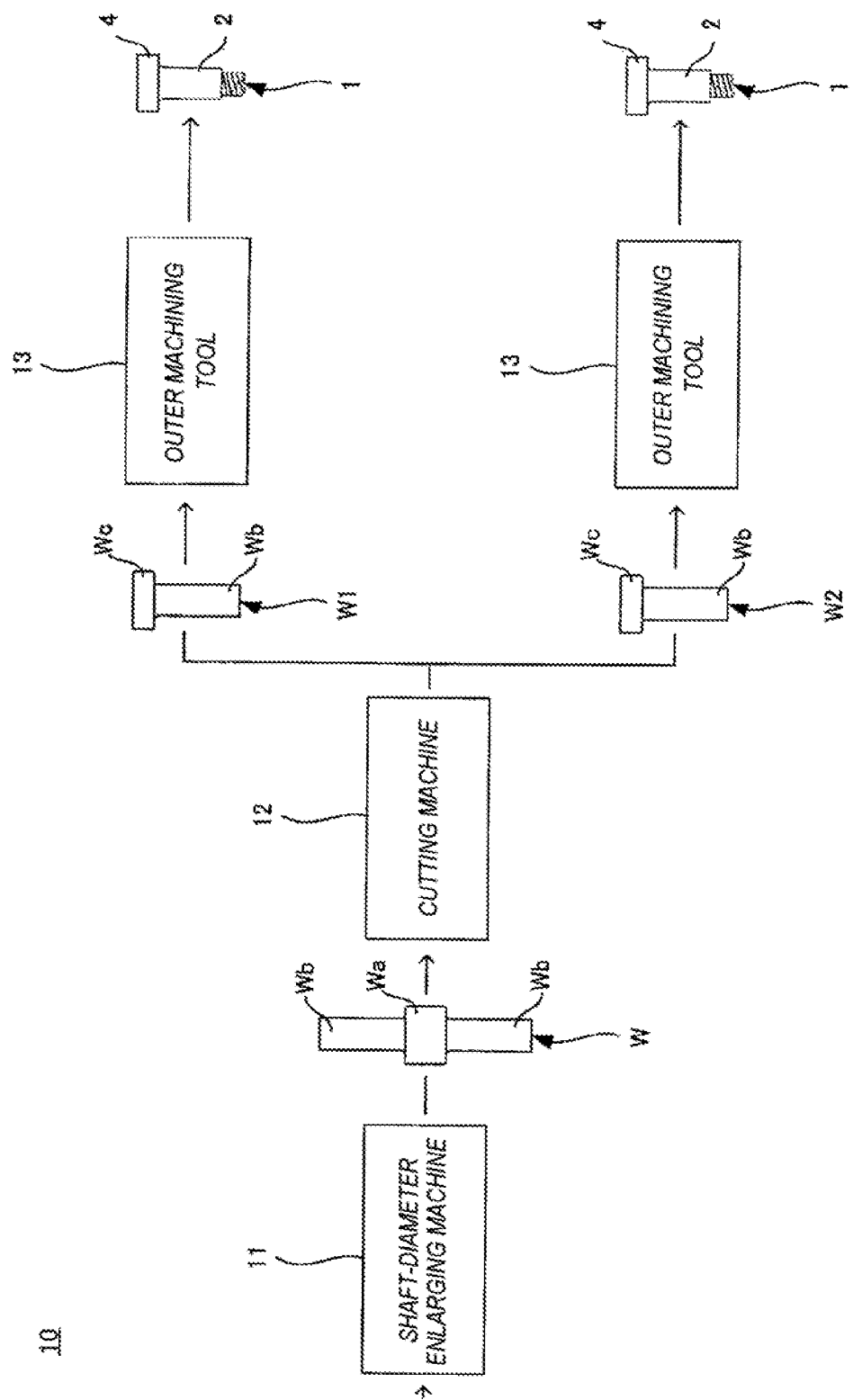
FIG. 2 is a diagram illustrating an example of an apparatus configured to manufacture the stepped member of FIG. 1.

FIG. 1 illustrates a bolt 1 as an example of a stepped member, and FIG. 2 illustrates an example of an apparatus 10 for manufacturing the bolt 1.

As shown in FIG. 1, the bolt 1 has a shaft portion 2 on which a thread 3 is formed and a head portion 4 provided at one end of the shaft portion 2 and formed so as to be larger than the shaft portion 2 in diameter.

The bolt is manufactured from a shaft workpiece W having a cylindrical shape (a circular pipe shape in this example). As shown in FIG. 2, the apparatus 10 for manufacturing the bolt 1 has a shaft-diameter enlarging machine 11 configured to radially enlarge an axially intermediate portion of the shaft workpiece W, a cutting machine 12 configured to cut the enlarged intermediate portion Wa of the shaft workpiece W in a direction perpendicular to the axial direction of the shaft workpiece W so that the shaft workpiece W is divided into two stepped members W1, W2, and outer machining tools 13 each configured to machine an outer surface of the corresponding one of the stepped members W1, W2.

The delivery of the shaft workpiece W between the shaft-diameter enlarging machine 11 and the cutting machine 12 and the delivery of the stepped members W1, W2 between the cutting machine 12 and the outer machining tools 13 are performed, for example, by conveyance machines, such as robot arms or conveyor belts, or by workers.

FIGS. 3A to 3E illustrate an example of a shaft-diameter enlarging process for the shaft member W.

The shaft-diameter enlarging machine 11 applies pressure that compresses the shaft workpiece W in the axial direction to both ends of the shaft workpiece and applies an alternating load to the intermediate portion of the shaft workpiece W in a direction intersecting the axial direction, thereby radially enlarging the intermediate portion of the shaft workpiece W while compressing the shaft workpiece W in the axial direction. In the example shown in FIGS. 3A to 3E, the intermediate portion of the shaft workpiece W is enlarged by providing a bending angle to the shaft workpiece W and by rotating the shaft workpiece W.

Figure 3A:
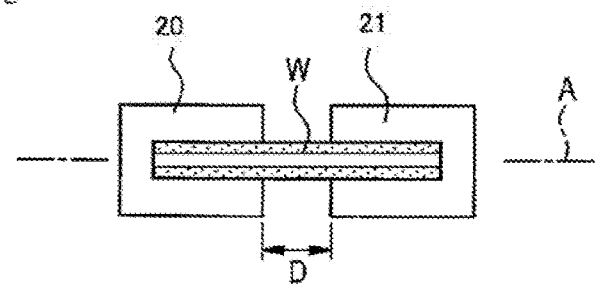
FIG. 3A is a diagram illustrating a first example of a shaft-diameter enlarging process performed by a shaft-diameter enlarging machine of the apparatus of FIG. 2.

As shown in FIG. 3A, the axial end portions of the shaft workpiece W are inserted into a pair of shaft holding sleeves 20, 21 disposed so as to be opposed to each other on a reference line A. The respective ends of the shaft workpiece W are caused to abut the bottom portions of the shaft holding sleeves 20, 21, whereby the shaft workpiece W is held by the pair of shaft holding sleeves 20, 21. A distance D is provided between the pair of shaft holding sleeves 20, 21. The distance D is determined depending on the axial length and the outside diameter of the enlarged portion that is formed on the shaft workpiece W by the shaft-diameter enlarging process.

Figure 3B:
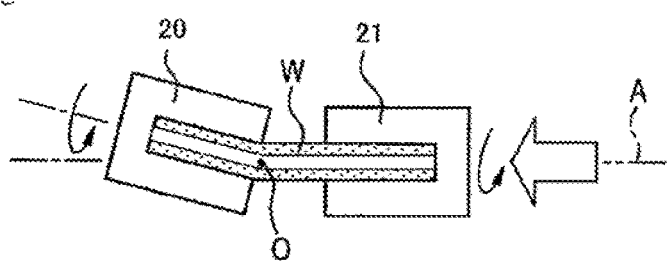
FIG. 3B is another diagram illustrating the first example of the shaft-diameter enlarging process.

As shown in FIG. 3B, the shaft holding sleeve 21, that is, one of the shaft holding sleeves, is translationally moved along the reference line A, whereby the shaft workpiece W grasped by the pair of shaft holding sleeves 20, 21 is compressed in the axial direction. Concurrently, the other shaft holding sleeve 20 is inclined with respect to the reference line A and is driven so as to be rotated, whereby the shaft workpiece W grasped by the pair of shaft holding sleeves 20, 21 is bent around the bending center O on the reference line A and rotated around the axial line of the shaft workpiece W. As the shaft workpiece W is bent and rotated, an alternating load is applied to the bent portion (intermediate portion) of the shaft workpiece W in a direction intersecting the axial direction of the shaft workpiece W on the inside and the outside in the bending direction.

Figure 3C:
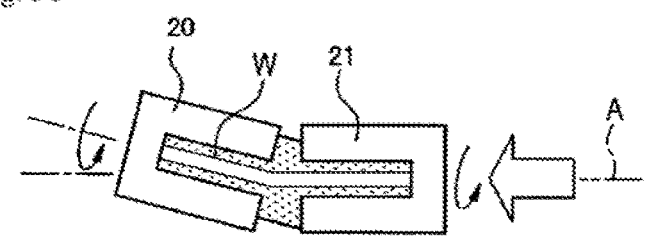
FIG. 3C is another diagram illustrating the first example of the shaft-diameter enlarging process.

As shown in FIG. 3C, since the shaft workpiece W is compressed in the axial direction, the inside of the bent portion of the shaft workpiece W bulges by plastic deformation, and the bulging due to the plastic deformation grows around the entire circumference, whereby the bent portion of the shaft workpiece W is radially enlarged.

Figure 3D:
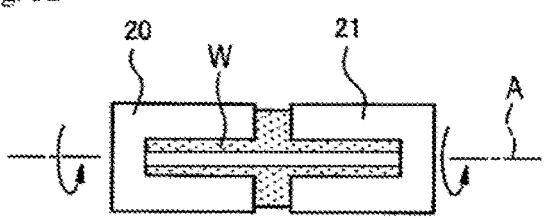
FIG. 3D is another diagram illustrating the first example of the shaft-diameter enlarging process.

As shown in FIG. 3D, after the distance between the pair of shaft holding sleeves 20, 21 has reached a target distance (the axial length of the enlarged portion of the shaft workpiece W), the compression of the shaft workpiece W stopped, and the shaft holding sleeve 20 being inclined with respect to the reference line A is disposed again along the reference line A, whereby the shaft workpiece W having been bent is straightened. The shaft-diameter enlarging process for the shaft workpiece W is completed and the rotation of the shaft workpiece W is stopped by following the above-mentioned procedure.

Figure 3E:
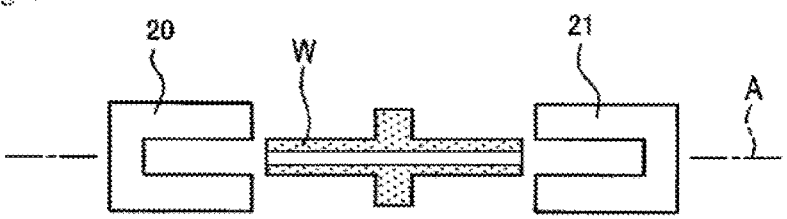
FIG. 3E is another diagram illustrating the first example of the shaft-diameter enlarging process.

And then, as shown in FIG. 3E, the shaft workpiece W is removed from the pair of shaft holding sleeves 20, 21.

The shaft-diameter enlarging process is not limited to the example illustrated in FIGS. 3A to 3E. FIGS. 4A to 4C, FIGS. 5A and 5B, FIGS. 6A and 6B, and FIGS. 7A and 7B respectively illustrate other examples of the shaft-diameter enlarging process for the shaft workpiece W.

Figure 4A:
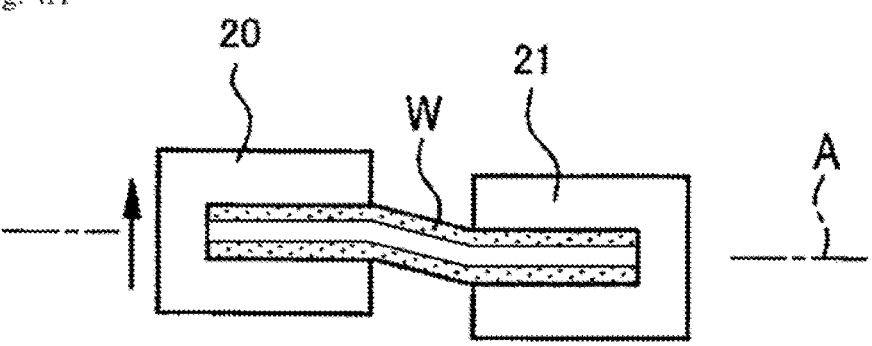
FIG. 4A is a diagram illustrating a second example of the shaft-diameter enlarging process.
Figure 4B:
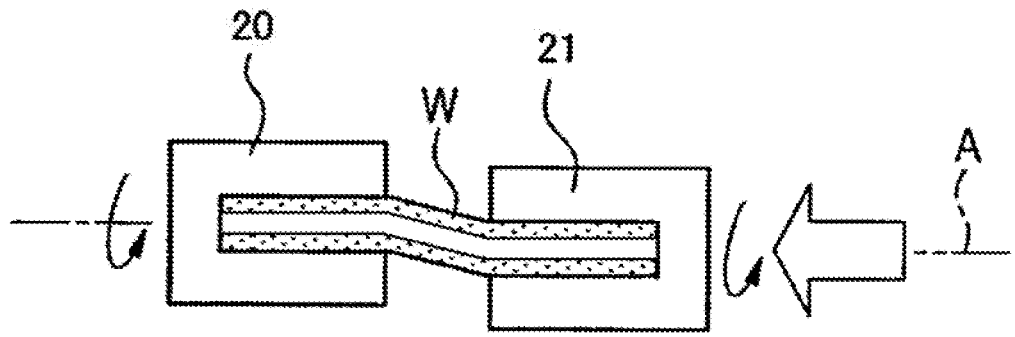
FIG. 4B is another diagram illustrating the second example of the shaft-diameter enlarging process.
Figure 4C:
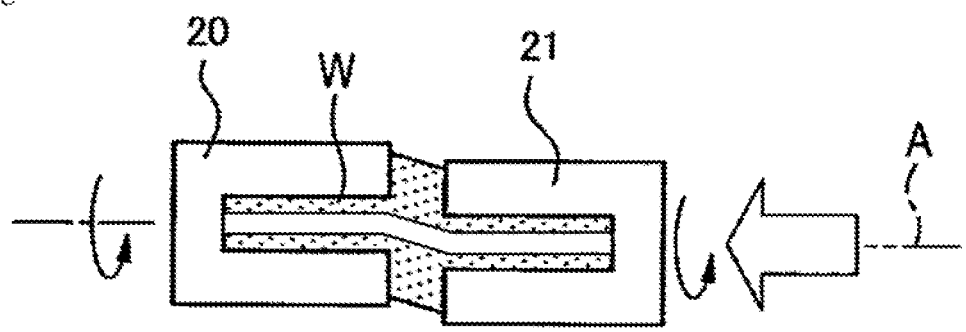
FIG. 4C is another diagram illustrating the second example of the shaft-diameter enlarging process.

The shaft-diameter enlarging method shown in FIGS. 4A to 4C and the shaft-diameter enlarging method shown in FIGS. 3A to 3E are the same in that an alternating load is applied to the bent portion (intermediate portion) of the shaft workpiece W by the bending of the shaft workpiece W and by the rotation of the shaft workpiece W around the axial line. However, in the shaft-diameter enlarging method shown in FIGS. 4A to 4C, instead of being inclined with respect to the reference line A, the shaft holding sleeve 20 is slid in a direction intersecting the reference line A to bend the shaft workpiece W.

Figure 5A:
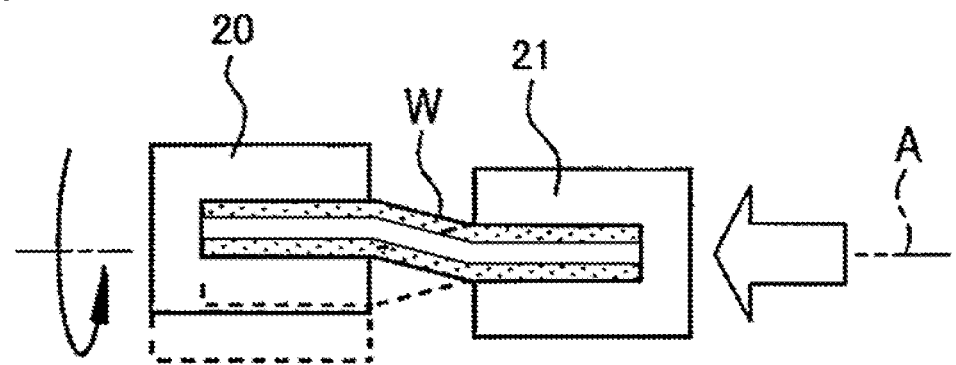
FIG. 5A is a diagram illustrating a third example of the shaft-diameter enlarging process.
Figure 5B:
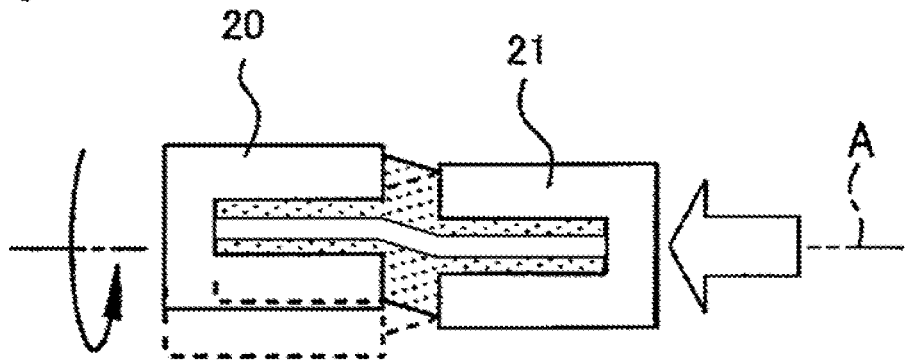
FIG. 5B is another diagram illustrating the third example of the shaft-diameter enlarging process.

In the shaft-diameter enlarging method shown in FIGS. 5A and 5B, an end portion of the shaft workpiece W is held by the shaft holding sleeve 20 in an unlocked state so as to be rotatable, and the other end portion of the shaft workpiece W is held by the other shaft holding sleeve 21 in a locked state so as to be unrotatable, and then the shaft holding sleeve 20 and the end portion of the shaft workpiece W being held by the shaft holding sleeve 20 are swiveled around the reference line A, whereby the shaft workpiece W is bent and an alternating load is applied to the bent portion (intermediate portion) of the shaft workpiece W.

Figure 6A:
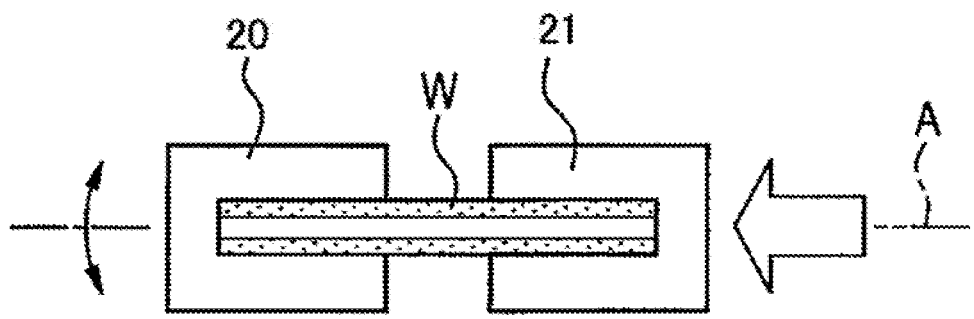
FIG. 6A is a diagram illustrating a fourth example of the shaft-diameter enlarging process.
Figure 6B:
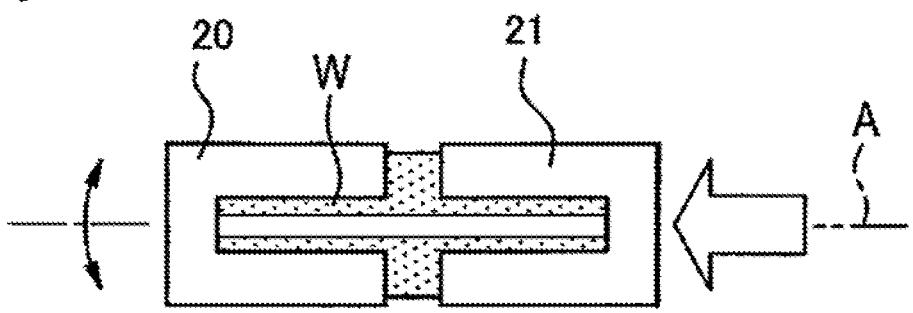
FIG. 6B is another diagram illustrating the fourth example of the shaft-diameter enlarging process.

In the shaft-diameter enlarging method shown in FIGS. 6A and 6B, the end portions of the shaft workpiece W are respectively held by the pair of shaft holding sleeves 20, 21 in a locked state so as to be unrotatable, and the shaft holding sleeve 20 is reciprocally rotated around the reference line A, whereby an alternating load is applied to the intermediate portion of the shaft workpiece W.

Figure 7A:
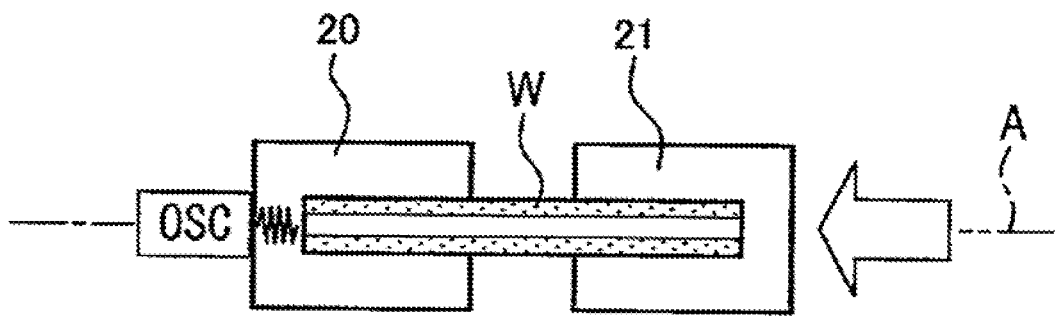
FIG. 7A is a diagram illustrating a fifth example of the shaft-diameter enlarging process.
Figure 7B:
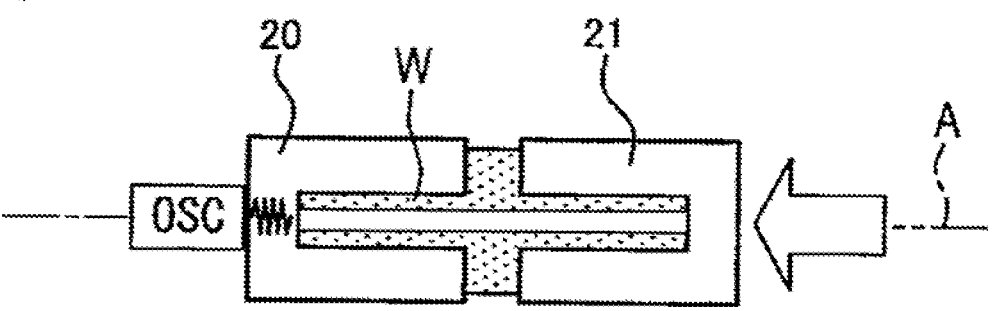
FIG. 7B is another diagram illustrating the fifth example of the shaft-diameter enlarging process.

In the shaft-diameter enlarging method shown in FIGS. 7A and 7B, instead of the displacement or rotation of the pair of shaft holding sleeves 20, 21 and the shaft workpiece W, bending oscillation or torsional oscillation is applied to the shaft workpiece W from an oscillation generator OSC, whereby an alternating load is applied to the intermediate portion of the shaft workpiece W.

In the shaft-diameter enlarging methods described above, by using a circular pipe-shaped shaft workpiece W (i.e., a hollow shaft workpiece W), the compression of the shaft workpiece W can be speeded up as compared with a solid shaft workpiece, whereby the time required for the process can be shortened, and the productivity of the process can be enhanced. Further, with the hollow shaft workpiece W, the compression pressure applied to the circular pipe-shaped shaft workpiece W can be reduced so that the shaft-diameter enlarging machine 11 can be downsized as compared with a case of a solid shaft workpiece.

Figure 8:
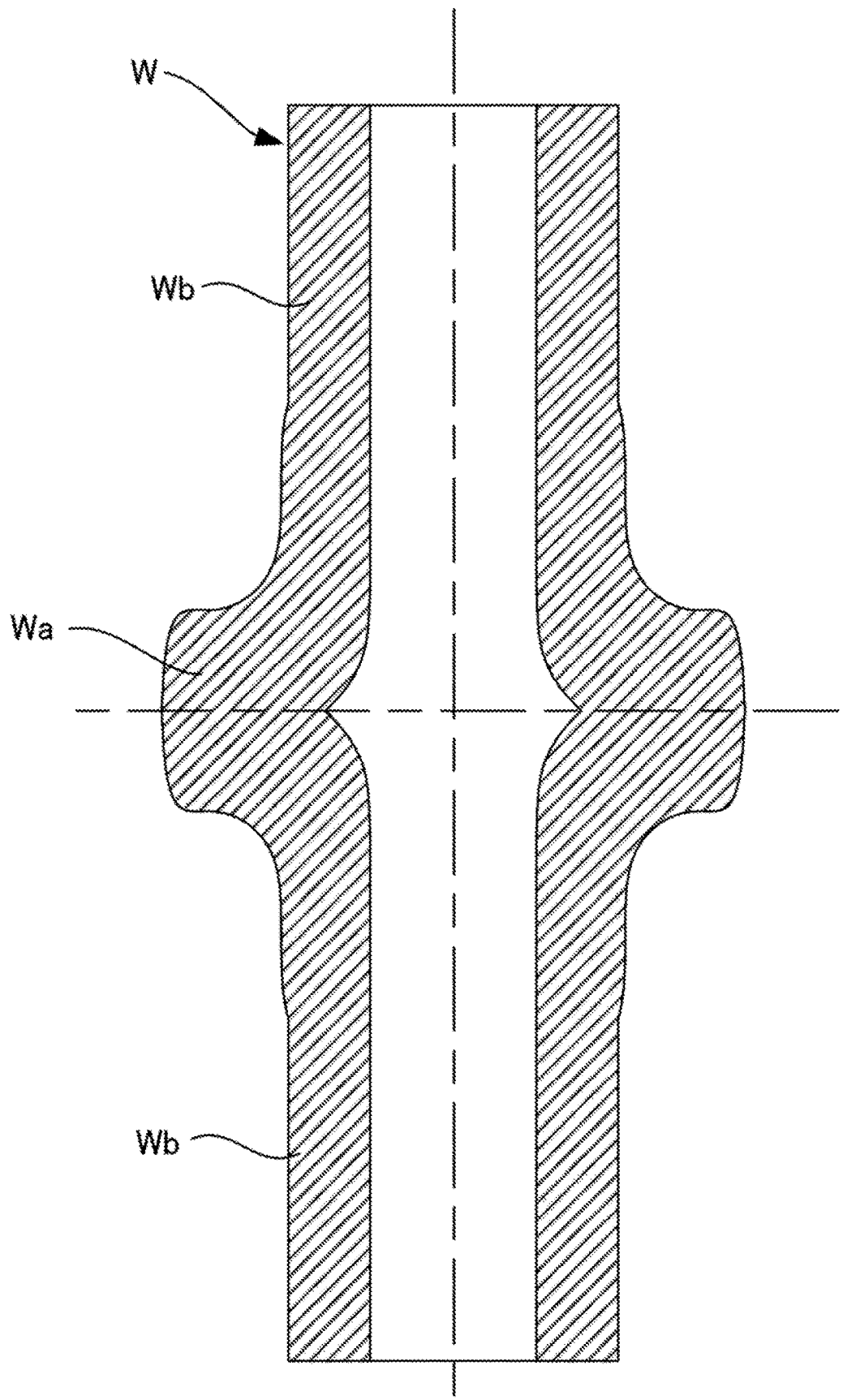
FIG. 8 is a sectional view of an example of a shaft-diameter enlarged workpiece.

FIG. 8 illustrates a cross-sectional shape of the shaft workpiece W subjected to the shaft-diameter enlarging process.

When the circular pipe-shaped shaft workpiece W is subjected to the shaft-diameter enlarging process, an enlarged portion Wa having a larger diameter than the shaft portions Wb of the shaft workpiece W is formed between the shaft portions Wb at both axial end portions of the shaft workpiece W, and the inside of the shaft workpiece W is formed so as to be hollow throughout in die axial direction. The inner circumferential face of the enlarged portion Wa is substantially symmetric with respect to the center along which the enlarged portion Wa is divided equally with respect to the axial direction, and the inner circumferential face expands radially outward as the inner circumferential face approaches the center.

The enlarged portion Wa is thin-walled at its axially central location due to the radially outward expansion of the inner circumferential face, thereby being low in strength. The local strength reduction at the axially intermediate portion of a shaft workpiece is undesirable because, for example, the intermediate portion may become a break start point. In the manufacturing of the bolt 1, the enlarged portion Wa is cut and the shaft workpiece W is divided into the two stepped members W1, W2 to avoid the influence of the strength reduction at the axially central part of the enlarged portion Wa.

Figure 9:
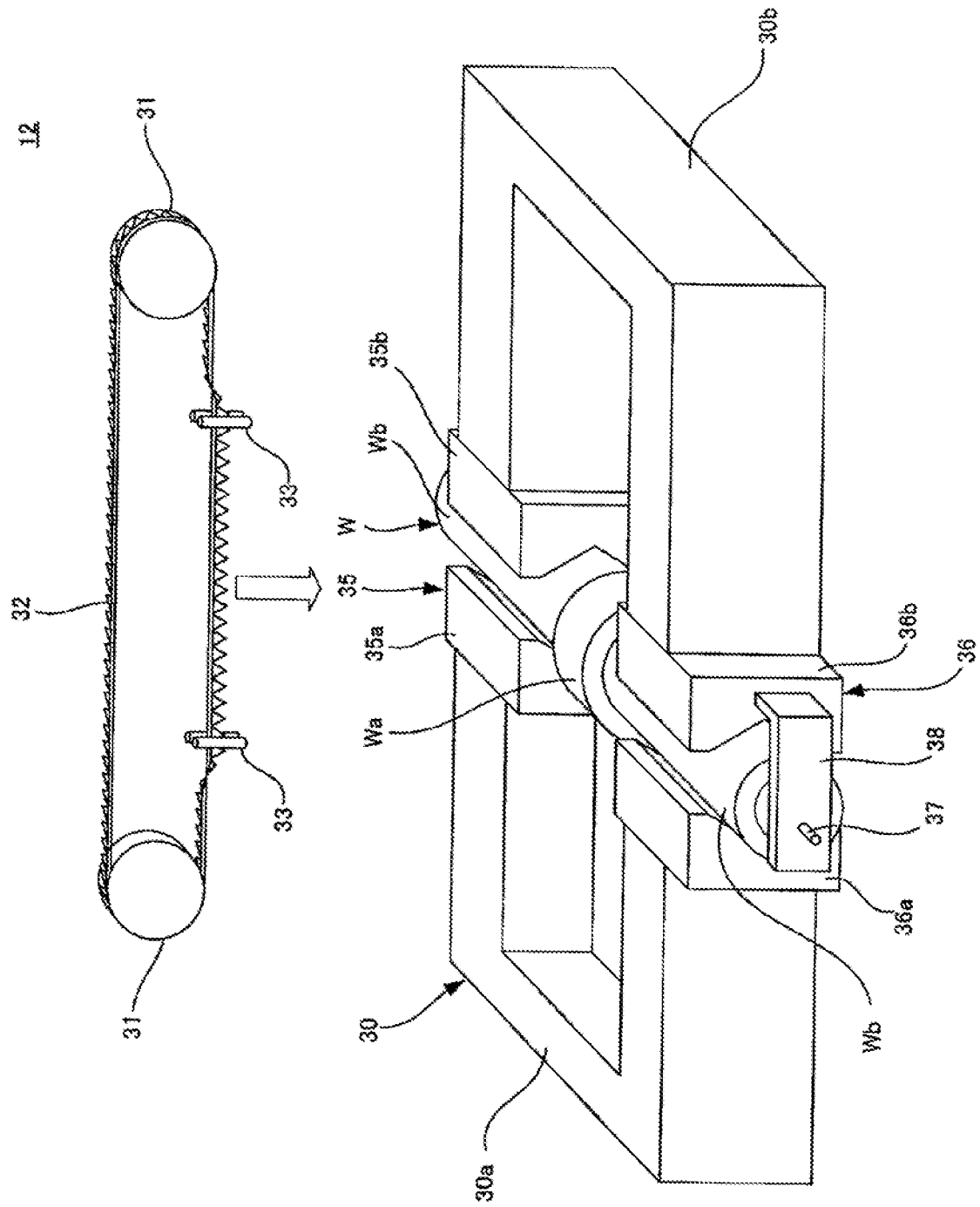
FIG. 9 is a perspective view of an example of a cutting machine of the apparatus of FIG. 2.
Figure 10:
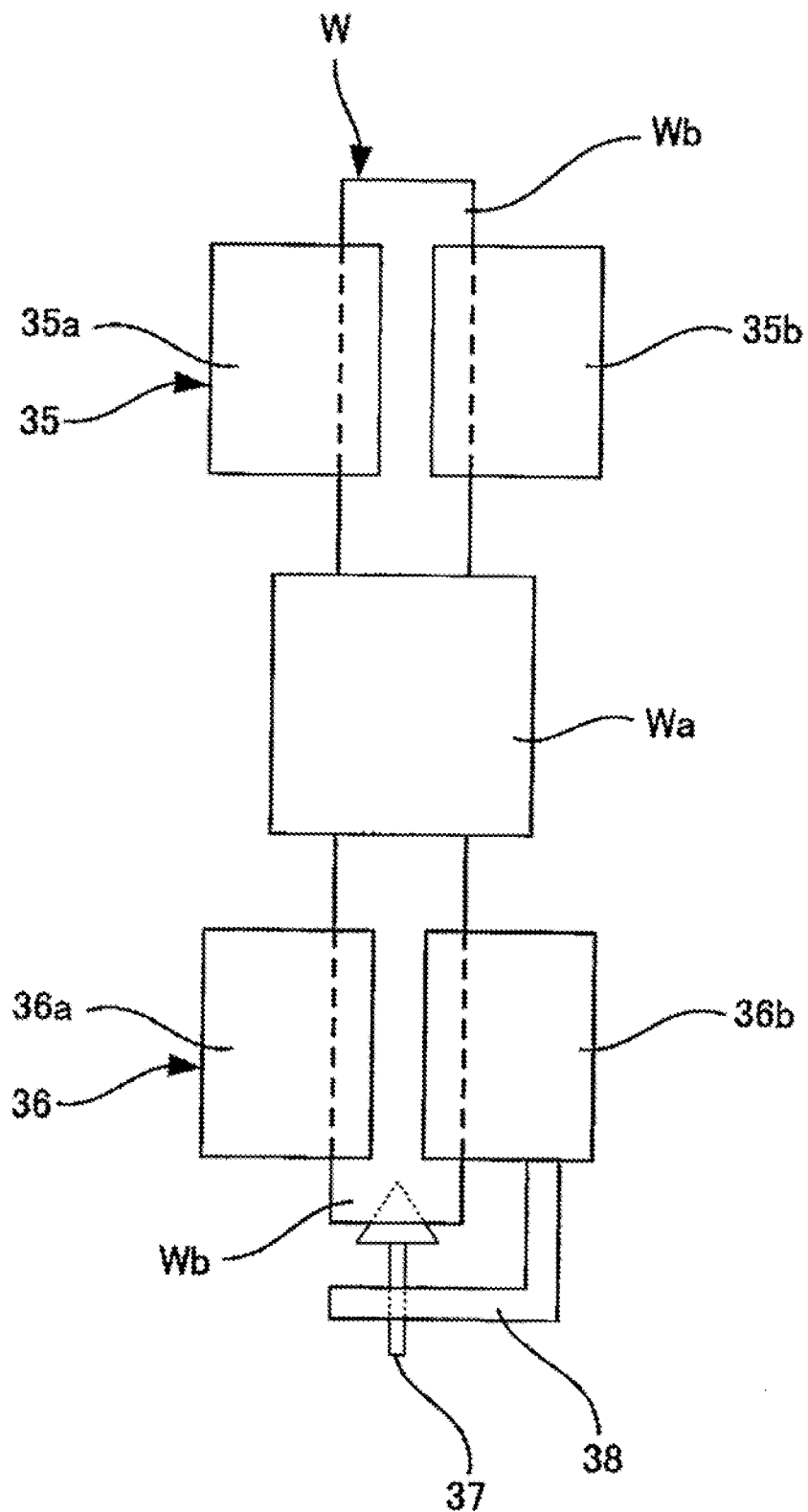
FIG. 10 is a plan view of an example of a jig used with the machine of FIG. 9.

FIG. 9 illustrates au example of the cutting machine 12, and FIG. 10 illustrates an example of a jig used with the cutting machine 12.

The cutting machine 12 according to the illustrated example is a band-saw type sawing machine, and has a vice 30 configured to hold the shaft workpiece W having the intermediate portion Wa enlarged by the shaft-diameter enlarging machine 11, a pair of pulleys 31 arranged with a distance provided therebetween in the horizontal direction and driven so as to be rotated within a vertical plane, an endless saw blade 32 extended between the pair of pulleys 31, and a pair of rollers 33 for twisting the saw blade 32 so that the edge of saw blade 32 is directed to the shaft workpiece W held in the vice 30.

The shaft workpiece W is placed in the vice 30 via the jig. The jig has holding sections 35, 36 configured to hold the respective shaft portions Wb on both sides of the enlarged portion Wa of the shaft workpiece W and a pin 37 for positioning the shaft workpiece W in the jig.

The holding section 35 includes a pair of blocks 35a, 35b respectively secured to a pair of jaws 30a, 30b of the vice 30. A substantially V-shaped groove into which the shaft portion Wb of the shaft workpiece W is fitted is provided on each side face of the blocks 35a, 35b opposed to each other.

Like the holding section 35, the holding section 36 includes a pair of blocks 36a, 36b respectively secured to the pair of jaws 30a, 30b of the vice 30. A substantially V-shaped groove into which the shaft portion Wb of the shaft workpiece W is fitted is provided on each side face of the blocks 36a, 36b opposed to each other.

The pin 37 is supported by a bracket 38 joined to the block 36b of the holding section 36. The pin 37 is contacts an end face of the shaft workpiece W, thereby positioning the shaft workpiece W in the axial direction. The pin 37 is supported by the bracket 38 so as to be movable in the axial direction of the shaft workpiece W, and the protruding length of the pin 37 from the bracket 38 is adjusted so that the axial center of the enlarged portion Wa to be positioned by the pin 37 in the axial direction is disposed just below the saw blade 32.

The pulleys 31, the saw blade 32 and the pair of rollers 33 are moved in the vertical direction by a driving mechanism, not shown. As the saw blade 32 is lowered, the axial center of the enlarged portion Wa disposed just below the saw blade 32 is cut in a direction perpendicular to the axial direction. As a result, the shaft workpiece W is divided into the two stepped members W1, W2, each having the shaft portion Wb and a head portion Wc (see FIG. 2).

As described above, the radially outward expansion of the inner circumferential face, a factor causing the strength reduction of the enlarged portion Wa, occurs so as to be substantially symmetric with respect to the center along which the enlarged portion Wa is divided equally with respect to the axial direction. The edge of the expanded portion is removed by cutting the enlarged portion Wa at the center in a direction perpendicular to the axial direction, whereby the edge of the expanded portion does not remain at the respective head portions Wc of the stepped members W1, W2 that are obtained by dividing the enlarged portion Wa. Consequently, it is possible prevent the strength of the axial center of the enlarged portion Wa from affecting the strength of the stepped members W1, W2 and the product strength of the bolts 1.

The cutting of the shaft workpiece W is not limited to the cutting by the sawing machine described above. For example, the shaft workpiece W may be cut by a cutting-off lathe.

The outer surfaces of the two stepped members W1, W2 divided from the shaft workpiece W by the cutting machine 12 are machined by the outer machining tools 13 (see FIG. 2), whereby the stepped members W1, W2 are formed into the bolts 1, the respective shaft portions Wb of the stepped members W1, W2 are formed into the shaft portions 2 of the bolts 1, and the head portions Wc of the respective stepped members W1, W2 are formed into the head portions 4 of the bolts 1.

Since the shaft workpiece W subjected to the shaft-diameter enlarging process is divided into the two stepped members W1, W2 each having the shaft portion Wb and the head portion Wc and the divided two stepped members W1, W2 are respectively machined so as to be formed into the bolts 1 each having the shaft portion 2 and the head portion 4, the manufacturing time required per single bolt 1 can be shortened and the productivity of the manufacturing can be enhanced, even though the bolts 1 are manufactured by the shaft-diameter enlarging process that has a relatively low processing speed.

Further, since the circular pipe-shaped shaft workpiece W, that is, the hollow shaft workpiece W, is used, the enlarged portion Wa formed by subjecting the shaft workpiece W to the shaft-diameter enlarging process becomes hollow. Hence, the time required for cutting the enlarged portion Wa can be made shorter than the time required for cutting the solid enlarged portion formed by subjecting a solid shaft workpiece to the shaft-diameter enlarging process, whereby the manufacturing time required per single bolt 1 can be shortened and the productivity of the manufacturing can be enhanced. Moreover, since the hollow shaft workpiece W is used, the stepped members W1, W2 and the bolt 1 also become hollow and can be reduced in weight.

Further, in the manufacturing apparatus 10 shown in FIG. 2, the two stepped members W1, W2 are concurrently subjected to an outer machining process using the two outer machining tools 13. With this process, the manufacturing time required per single bolt 1 can be further shortened and the productivity of the manufacturing can also be further enhanced in comparison with a case in which the two stepped members W1, W2 are sequentially subjected to the outer machining process using a single outer machining tool 13.

The concurrent process using the two outer machining tools 13 is particularly useful in a case in which the cycle time t1 of the outer machining tool 13 (the time required for the outer machining process per single stepped member) is longer than half the cycle time t2 of the shaft-diameter enlarging machine 11 (the time required for the shaft-diameter enlarging process per single shaft workpiece), i.e., t1>t2/2. In this case, by performing the concurrent process using the two outer machining tools 13, it is possible to suppress the stagnation of the stepped members to be sequentially supplied to the outer machining process after the shaft-diameter enlarging process and the cutting process.

In the case that the cycle time t1 of the outer machining tool 13 is longer than the cycle time t2 of the shaft-diameter enlarging machine 11 (t1>t2), multiple sets of the outer machining tools 13, each set consisting of the two outer machining tools 13, may be used, and each set of the outer machining tools 13 may be sequentially assigned to the set of two stepped members W1, W2 to be sequentially supplied to the outer machining process after the shaft-diameter enlarging process and the cutting process.

While the present invention has been described with reference to certain embodiments thereof, the scope of the present invention is not limited to the embodiments described above, and it will be understood by those skilled in the art that various changes and modifications may be made therein without departing from the scope of the present invention as defined by the appended claims.

For example, while the bolt 1 has been described as an example of the stepped member, the stepped member is not limited to a bolt, and may be a different member that has a shaft portion and a head portion provided at an axial end of the shaft portion and having a larger diameter than the shaft portion. In addition, although the method and apparatus for manufacturing stepped members from the hollow shaft workpiece W have been described in the above example, the method and the apparatus according to the present invention are applicable to the manufacturing of stepped members from a solid shaft workpiece, and also in the case that the method and the apparatus are applied to the manufacturing of stepped members from a solid shaft workpiece, the productivity can be made higher than that of the shaft-diameter enlarging processes of the related arts. Furthermore, while the enlarged portion Wa is cut at its center at which the enlarged portion Wa is divided equally with respect to the axial direction in the example described above, the enlarged portion Wa may be cut at a position other than the center of the enlarged portion Wa.

This application is based on Japanese Patent Application No. 2015-098898 filed on May 14, 2015, Japanese Patent Application No. 2015-187128 filed on Sep. 24, 2015 and Japanese Patent Application No. 2015-200972 filed on Oct. 9, 2015, the entire contents of which are incorporated herein by reference.

The invention claimed is:

1. A method for manufacturing a stepped member having a shaft portion and a head portion provided at an axial end of the shaft portion, the head portion having a larger diameter than the shaft portion, the method comprising:
   radially enlarging an intermediate portion of a shaft workpiece while compressing the shaft workpiece in an axial direction of the shaft workpiece, the radially enlarging including applying alternating load to the intermediate portion of the shaft workpiece in a direction intersecting the axial direction in a state in which pressure that compresses the shaft workpiece in the axial direction is applied to both ends of the shaft workpiece;
   dividing the shaft workpiece into two stepped members, the dividing including cutting the enlarged intermediate portion of the shaft workpiece in a direction perpendicular to the axial direction; and
   machining outer surfaces of the two stepped members, into which the shaft workpiece has been divided, concurrently by using two outer machining tools,
   wherein a cycle time of the machining is longer than half of a cycle time of the radially enlarging.

2. The method according to claim 1, wherein the shaft workpiece has a pipe shape, and wherein the cutting includes cutting the enlarged intermediate portion of the shaft workpiece at a center of the intermediate portion such that the intermediate portion is divided equally with respect to the axial direction.

* * * * *